US007905136B2

(12) United States Patent
Sutter et al.

(10) Patent No.: US 7,905,136 B2
(45) Date of Patent: Mar. 15, 2011

(54) METHOD OF OPERATING A FUEL INJECTOR

(75) Inventors: Kai Sutter, Stuttgart (DE); Oliver Becker, Schriessheim (DE)

(73) Assignee: Robert Bosch GmbH, Stuttgart (DE)

( * ) Notice: Subject to any disclaimer, the term of this patent is extended or adjusted under 35 U.S.C. 154(b) by 388 days.

(21) Appl. No.: 12/220,232

(22) Filed: Jul. 22, 2008

(65) Prior Publication Data

US 2009/0045267 A1 Feb. 19, 2009

(30) Foreign Application Priority Data

Jul. 23, 2007 (DE) ........................ 10 2007 034 188

(51) Int. Cl.
*G01M 15/09* (2006.01)

(52) U.S. Cl. .................................................... 73/114.51

(58) Field of Classification Search ............... 73/114.38, 73/114.45, 114.48, 114.49, 114.51
See application file for complete search history.

(56) References Cited

U.S. PATENT DOCUMENTS

| | | | | |
|---|---|---|---|---|
| 6,712,047 | B2 * | 3/2004 | Rueger | 123/479 |
| 7,210,458 | B2 * | 5/2007 | Walther et | 123/446 |
| 2003/0154806 | A1 * | 8/2003 | Rueger | 73/865.9 |
| 2007/0001545 | A1 * | 1/2007 | Schoor et al. | 310/317 |
| 2007/0182280 | A1 * | 8/2007 | Huber et al. | 310/316.03 |

* cited by examiner

*Primary Examiner* — Eric S McCall
(74) *Attorney, Agent, or Firm* — Kenyon & Kenyon LLP

(57) ABSTRACT

A method for operating an injection valve, in particular a fuel injector of an internal combustion engine, in which a trigger voltage is able to be applied to an actuator, designed as piezoelectric element, of the fuel injector in order to induce an injection of fluid, in particular fuel, supplied to the fuel injector via a supply system. A specifiable test voltage is applied to the actuator in a test triggering, and a fluid pressure prevailing in the supply system is detected at least during the test triggering in order to derive information about an operating state of the fuel injector and/or the actuator from the test voltage and the detected fluid pressure.

22 Claims, 4 Drawing Sheets

METHOD OF OPERATING A FUEL INJECTOR

FIELD OF THE INVENTION

The present invention relates to a method for operating an injection valve, in particular a fuel injector of an internal combustion engine, in which a trigger voltage is able to be applied to an actuator of the fuel injector, the actuator being designed as piezoelectric element, in order to induce an injection of a fluid, in particular fuel, which is supplied to the injection valve via a supply system. Furthermore, the present invention relates to a computer program for executing the afore-described method, and to a control device for the injection valve.

BACKGROUND INFORMATION

Operating methods and control devices of this type are used especially in modern Diesel and Otto engines, for example, in order to directly move a valve needle of the fuel injector back and forth between different working positions and thereby control the injection of fuel. The use of piezoelectric actuators is advantageous in this context in particular in view of the high dynamic demands in connection with the movement of the valve needle.

However, the mechanical and electrical characteristics of the utilized piezoelectric actuators do not remain constant throughout their service life. Both an actuator travel and the rigidity as well as the electrical capacity of the piezoelectric actuator change over the course of the service life. A direct detection of these changes during operation, and thus their compensation as well, is impossible without complicated measuring technology. This results in errors in the injected fuel quantity.

Wear of possibly installed additional components, especially hydraulic components, that are part of a chain of action which includes the valve needle and the piezoelectric actuator, may also have a negative effect on the precision of the injected fuel quantity.

SUMMARY OF THE INVENTION

Therefore, it is an object of the exemplary embodiments and/or exemplary methods of the present invention to improve an operating method and a control device of the type mentioned in the introduction in such a way that information about an operating or wear state of the involved components is obtained with less effort, and a precise fuel injection is possible across the entire service life of the components of the fuel injector.

According to the exemplary embodiments and/or exemplary methods of the present invention, in an operating method of the type mentioned in the introduction this object is achieved by applying a specifiable test voltage to the actuator in a test triggering, and by detecting a fluid pressure prevailing in the supply system at least during the test triggering in order to derive information about an operating state of the fuel injector and/or the actuator from the test voltage and the detected fluid pressure.

According to the exemplary embodiments and/or exemplary methods of the present invention, it was recognized that conclusions with regard to an operating and/or wear state of the piezoelectric actuator or additional components of the fuel injector are advantageously able to be drawn from changes in the fluid pressure that result in test triggerings of this type. This advantageously dispenses with the need to provide complex separate measuring technology for the purpose of detecting operating and wear states of the fuel injector. In general, the evaluation of two measured values for the fluid pressure, which may be ascertained directly prior to and following the test triggering, is sufficient to realize the method according to the present invention. In an advantageous manner, however, it is also possible to obtain a greater number of measured values for the fluid pressure during the test triggering; a time characteristic of the fluid pressure determined in this manner during the test triggering allows an especially precise evaluation of the operating and/or wear state.

One principle of the exemplary embodiments and/or exemplary methods of the present invention is based on the fact that a change in the fluid pressure during the test triggering makes it possible to infer a fuel quantity that was withdrawn from the supply system by the fuel injector, i.e., the injected fuel quantity, for example. In the same way, if no change exceeding a minimum limit occurs in the fluid pressure during the test triggering, then it may be concluded that sufficient triggering of the action chain that controls the injection has not taken place during application of the test voltage.

In one variant of the exemplary embodiments and/or exemplary methods of the present invention, a plurality of test triggerings using different values for the test voltage is carried out in an especially advantageous manner, and the resulting changes in the detected fluid pressure are ascertained. This makes it possible, for example, to determine the particular test voltage that must be set for a fuel injector based on its current state of wear in order to bring about an injection in the first place. Each of the plurality of test triggerings may be carried out over the same trigger period in order to ensure comparability of the results.

In an especially advantageous manner, a minimum or maximum trigger voltage of the actuator at which an injection takes place is able to be determined by one or a plurality of test triggerings according to the exemplary embodiments and/or exemplary methods of the present invention. The actual commencing of an injection as a result of the test triggering is able to be determined by a corresponding pressure drop in the fluid pressure detected during the test triggering according to the exemplary embodiments and/or exemplary methods of the present invention. Depending on the design of the functional chain of the fuel injector, both a drop in the trigger voltage and a rise in the trigger voltage of the actuator may be required to trigger an injection. The minimum or maximum trigger voltage determined according to the exemplary embodiments and/or exemplary methods of the present invention is also referred to as "voltage requirement" of the fuel injector or actuator.

In particular for those variants of the exemplary embodiments and/or exemplary methods of the present invention that provide the use of the fuel injector for the injection of fuel into a combustion chamber of a cylinder of an internal combustion engine, the test triggering according to the exemplary embodiments and/or exemplary methods of the present invention may advantageously be implemented periodically, which may also be during normal operation of the internal combustion engine, in order to provide current operating and wear information in this manner across the entire service life of the fuel injector. This advantageously ensures that the injection parameters are always able to be adapted to the instantaneous wear state of the fuel injector, which has an advantageous effect on compliance with the legally mandated emission limits, on the performance of the internal combustion engine and on the preservation of a normal operating noise of the internal combustion engine over the entire service life.

Another especially advantageous aspect of the test triggerings according to the exemplary embodiments and/or exemplary methods of the present invention is that they are also able to be carried out outside of conventional trigger times of the fuel injector or its actuator, which, in particular, makes it possible to implement normal operation of the internal combustion engine parallel with the method according to the present invention.

In one additional advantageous variant of the exemplary embodiments and/or exemplary methods of the present invention it may be provided to implement the test triggering (s) in a range of a working cycle of the cylinder of the internal combustion engine that does not affect the torque, and/or in trailing throttle operation of the internal combustion engine, so as not to interfere with the operation of the internal combustion engine. For instance, it is possible to shift the test triggering according to the exemplary embodiments and/or exemplary methods of the present invention to a time range of a working cycle of the cylinder during which no main injection but, for example, a relatively retarded secondary injection, which has a relatively low torque effect, is delivered. The method according to the present invention is advantageously able to be applied even in an idling operating mode of the internal combustion engine.

In another very advantageous variant of the method according to the present invention, in which the actuator is acting on a valve needle of the fuel injector via at least one hydraulic component, in particular a control valve, in order to induce an injection, a start value for the test voltage is advantageously selected in such a way that the triggering of the actuator using the start value for the test voltage does not cause any state change of the hydraulic component, in particular the control valve, to the effect that an injection takes place. Due to the afore-described selection of the start value for the test voltage, the test triggerings according to the exemplary embodiments and/or exemplary methods of the present invention, utilizing the operating behavior of the involved hydraulic components, are advantageously able to be carried out in such a way that the test triggerings will not cause continuous injections so that the adverse effect on an operation of the internal combustion engine is only minimal. For instance, beginning with the start value selected according to the exemplary embodiments and/or exemplary methods of the present invention, the test voltage may be increased successively within the framework of a plurality of test triggerings, so that at the end of a plurality of test triggerings sufficient information or measured values for the fluid pressure are available to evaluate an operating or wear state of the fuel injector or its component with sufficient accuracy.

In particular when using a control valve on which the piezoelectric actuator is acting, at least one operating range or voltage range in which test triggerings will not yet lead to an injection but nevertheless cause a change, in particular a drop, in the fluid pressure in the supply system, such change being detectable by measuring technology, for example, is advantageously provided for the test voltage. In the process, a slight quantity of the supplied fluid may, for instance, leak through the control valve during the test triggering and be resupplied to a low-pressure system, e.g., by way of a corresponding return line, without an injection being initiated already.

The voltage requirement of the fuel injector determined according to the present invention is of special importance for precise fuel metering; during the operating period of the fuel injector it may advantageously be used to modify trigger parameters of the fuel injector, in particular the trigger voltage, so that changes in the operating characteristics of the fuel injector or its components attributable to age or wear are able to be compensated.

In an especially advantageous manner, the start value for the test voltage is selected as a function of the fluid pressure and/or other performance quantities of the fuel injector in order to allow the method according to the present invention to be used in many different operating modes and simultaneously prevent that a first test triggering erroneously already causes an injection to take place.

The realization of the method according to the present invention is of special importance in the form of a computer program, which may be stored on an electronic storage medium, for example, and which is provided in a control device according to the present invention for the implementation of the method of the present invention.

Additional advantages, features and details result from the following description, in which various exemplary embodiments of the present invention are illustrated with reference to the drawing. The features described herein may be essential to the exemplary embodiments and/or exemplary methods of the present invention either individually as such or in any random combination.

DETAILED DESCRIPTION

Figure 1:
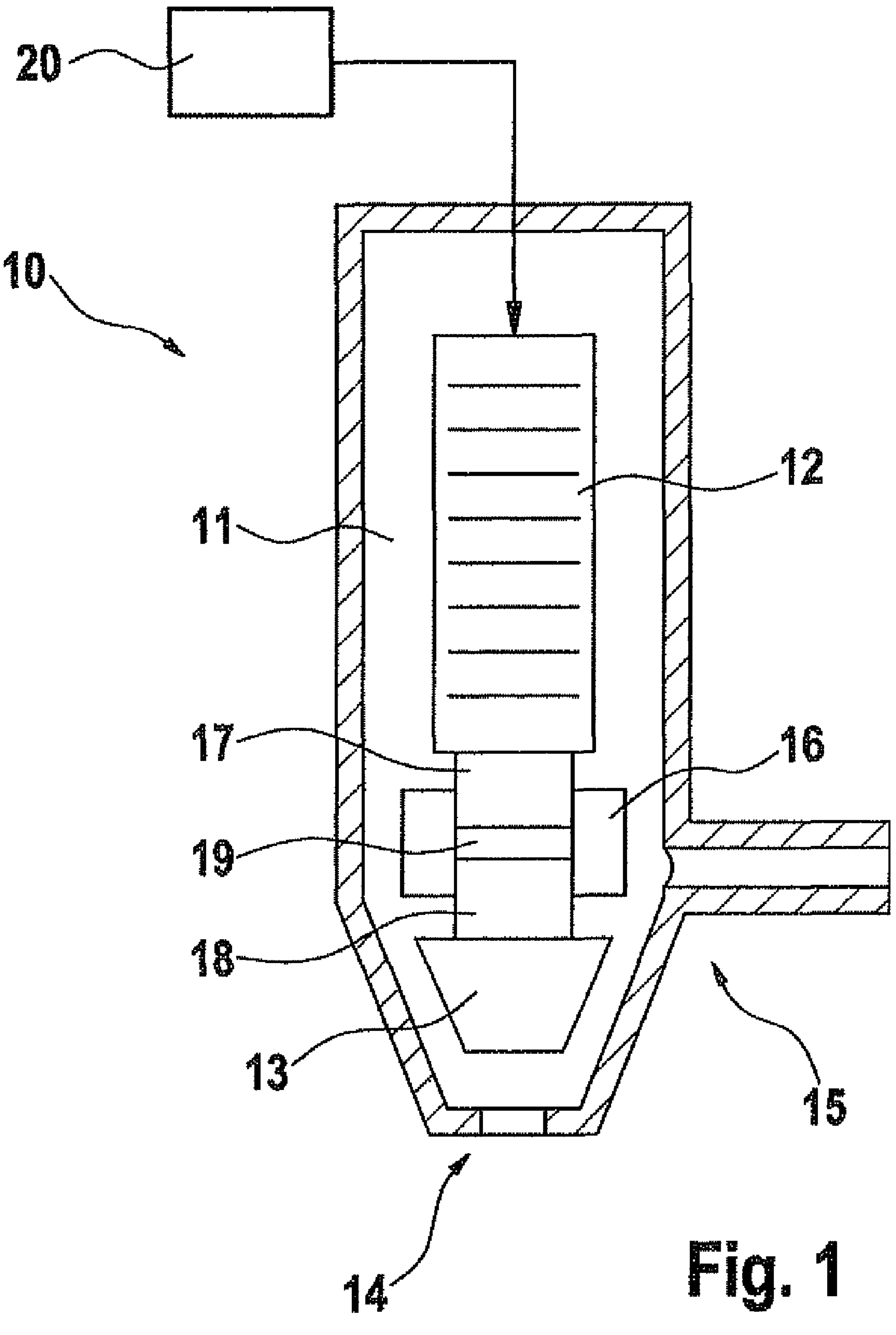
FIG. 1 schematically, a part-sectional view of one exemplary embodiment of a fuel injector for implementing the method according to the present invention.

FIG. 1 shows an injection valve, designed as fuel injector 10, of an internal combustion engine of a motor vehicle, which is equipped with a piezoelectric actuator 12. Piezoelectric actuator 12 is triggered by a control device 20, as shown in FIG. 1 by the connection arrow. Control device 20 includes an electronic storage medium (not shown), on which a computer program for implementing the method according to the present invention is stored.

Furthermore, fuel injector 10 has a valve needle 13, which is able to sit on a valve seat 14 in the interior of the housing of fuel injector 10. If valve needle 13 is lifted off from valve seat 14, then fuel injector 10 is open and fuel is injected. This state is shown in FIG. 1. A completely open state of fuel injector 10 is characterized by valve needle 13 resting against a needle travel stop (not shown), which prevents further movement of valve needle 13 away from its valve seat 14, i.e., in the direction of actuator 12. If valve needle 13 is seated on valve seat 14, fuel injector 10 is closed. That is to say, the entire travel of valve needle 13, which runs vertically in the illustration according to FIG. 1, is delimited by valve seat 14 on the one side (closed position) and by the needle travel stop (open position) on the other side.

The transition of fuel injector 10 from the closed to the open state and vice versa is achieved with the aid of piezoelectric actuator 12. An electric voltage, hereinafter also referred to as trigger voltage U, is applied to actuator 12 for this purpose, which induces a linear deformation of a piezo stack disposed inside actuator 12, which in turn is utilized to open or close fuel injector 10.

In addition, fuel injector 10 is equipped with a hydraulic coupler 15. Hydraulic coupler 15 is situated inside fuel injector 10 and includes a coupler housing 16 in which two plungers 17, 18 are guided. Plunger 17 is connected to actuator 12, and plunger 18 is connected to valve needle 13. Enclosed between both plungers 17, 18 is a volume 19, which transmits the force exerted by actuator 12 to valve needle 13.

Coupler 15 is surrounded by pressurized fuel 11, which is supplied to fuel injector 10 by a supply system (not shown). The supply system may, for example, include a fuel pressure reservoir, known also as a rail, via which it is also possible to supply a plurality of fuel injectors with pressurized fuel. Volume 19 of hydraulic coupler 15 is filled with fuel as well. Via the routing gap between the two plungers 17, 18 and coupler housing 16, volume 19 is able to adapt to the specific length of actuator 12 over a longer period of time. However, volume 19 remains virtually unchanged in response to short-term changes in the length of actuator 12, and the change in length of actuator 12 is transmitted to valve needle 13.

According to the exemplary embodiments and/or exemplary methods of the present invention, the method described in the following text is implemented for the purpose of obtaining information about an operating and/or wear state of fuel injector 10 and its components, in particular actuator 12.

Figure 3:
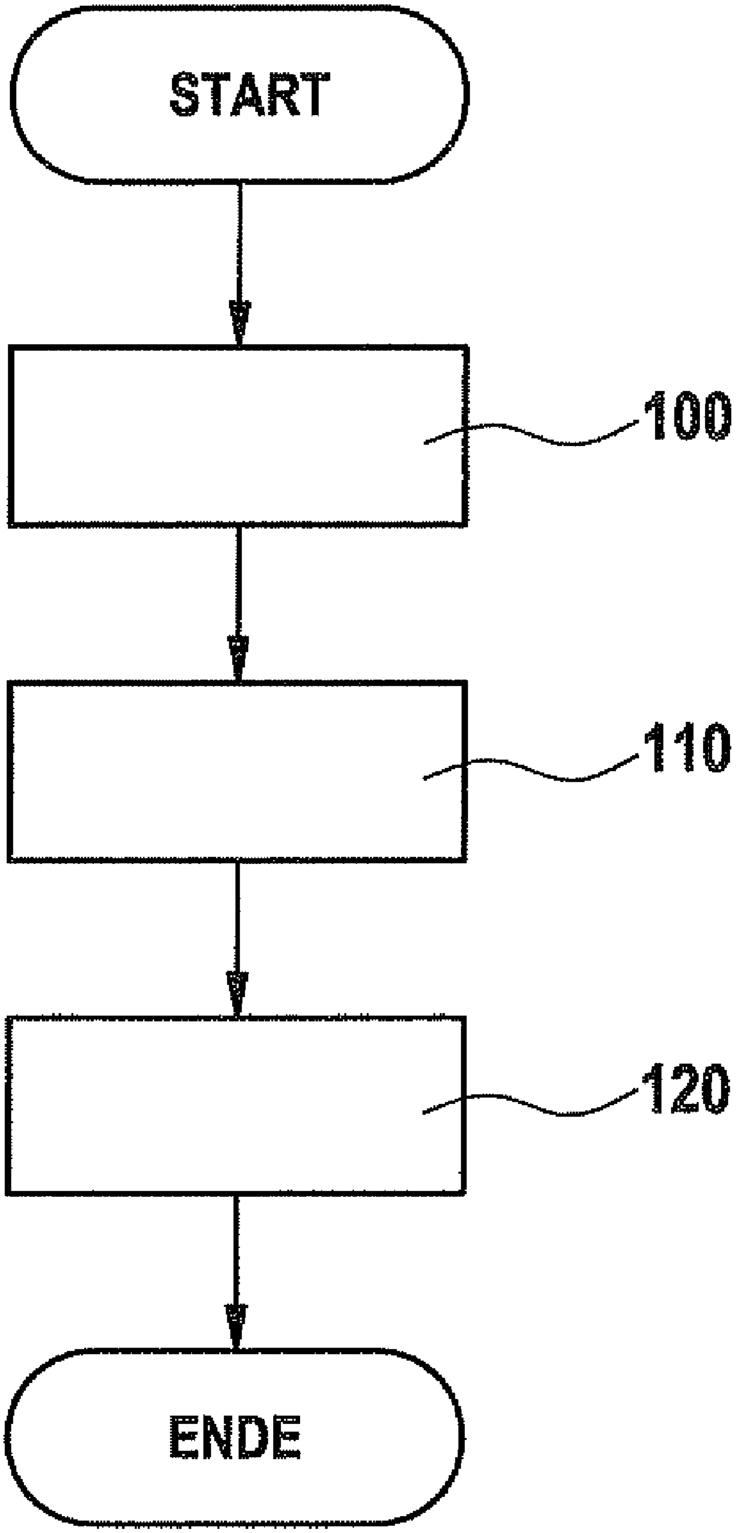
FIG. 3 a simplified flow chart of one specific embodiment of the operating method according to the present invention.

In a first step 100, cf. FIG. 3, beginning with its closing position, a specifiable test voltage is applied to piezoelectric actuator 12 of fuel injector 10 illustrated in FIG. 1, in order to implement a test triggering according to the exemplary embodiments and/or exemplary methods of the present invention.

Furthermore, using measuring technology, the fuel pressure of fuel 11 is detected during test triggering 100. A corresponding pressure measurement directly inside fuel injector 10 may be used for this purpose. However, the fuel pressure may be detected by a pressure sensor, which is provided directly in the supply system (not shown), for instance in the region of fuel pressure reservoir itself, so that no additional means for detecting the fuel pressure have to be provided in fuel injector 10 in order to realize the method according to the present invention.

Following test triggering 100, an evaluation of the previously acquired measured values for the fuel pressure takes place in step 110 (FIG. 3) of the method according to the present invention. In one especially uncomplicated variant of the method, evaluation 110 may include a simple subtraction operation of the detected measured values for the fuel pressure immediately prior to and following test triggering 100. If more than two measured values for the fuel pressure have been detected during test triggering 100, then it is also possible to provide and analyze a series of measured values representing the time characteristic of the fuel pressure within the framework of the evaluation. In general, the analysis may include the comparison of the detected data with stored reference data or the like.

However, the measured values for the fuel pressure, detected according to the exemplary embodiments and/or exemplary methods of the present invention, may be analyzed in order to ascertain whether a significant change, in particular a drop in the fuel pressure indicating a withdrawal of a corresponding fuel quantity from the supply system, has occurred during test triggering 100.

For example, even a slight drop in the fuel pressure in fuel injector 10 shown in FIG. 1 during test triggering 100 may indicate that the test voltage applied to actuator 12 during the test triggering was not high enough to induce a movement of valve needle 13 out of the closed position. However, if no sufficient decrease in the fuel pressure is detected during test triggering 100 via analysis 110, then it may be concluded that the utilized test voltage was insufficient to induce the withdrawal of a fuel quantity from the supply system or even to induce an injection. By carrying out a plurality of test triggerings using different test voltages, the voltage requirement of fuel injector 10 or actuator 12, i.e., the particular trigger voltage that is minimally required to induce an injection, is generally able to be determined in this manner.

In the case of fuel injector 10 shown in FIG. 1, as already described, the closed position is attained when valve needle 13 is seated on valve seat 14, so that actuator 12 has reached its maximum length and thus is charged to a maximum trigger voltage. As in the case at hand, the voltage requirement of actuator 1 may be indicated as the particular voltage differential by which the maximum trigger voltage must be reduced in order for valve needle 13 to move away from its valve seat 14 and for an injection to take place.

In fuel injectors having a different design, which may, for example, include additional hydraulic components such as servo or control valves in the functional chain of actuator—valve needle, the voltage requirements may be defined in a different, analogous manner; nevertheless, the principle of the exemplary embodiments and/or exemplary methods of the present invention is applicable to these systems, as well.

The voltage requirement ascertained in the analysis in step 110 (FIG. 3) of the method of the present invention may be utilized for future triggerings, cf. step 120, especially for the purpose of adapting the trigger parameters. This makes it possible to maintain the required precision in the injected fuel quantity across the entire service life of fuel injector 10, despite the wear that is manifesting itself on actuator 12 and mechanical or hydraulic components 13, 14, 15, . . . .

For example, after implementation of the method according to the present invention, a specified standard voltage requirement for a new fuel injector 10, permanently stored in control device 20, may be modified by a correction factor, the correction factor being formed as a function of the voltage requirement determined according to the exemplary embodiments and/or exemplary methods of the present invention at the end of a specific operating period. Among others, for example, the correction factor may indicate the extent to which the voltage requirement of a worn out actuator 12 has increased in comparison with the voltage requirement of new actuator 12.

Since the change in the fuel pressure inside the supply system or rail, detected according to the exemplary embodiments and/or exemplary methods of the present invention, is proportional to the withdrawn or injected fuel quantity in a first approximation, it is advantageously also possible to determine the fuel quantity actually withdrawn during the test triggering. If the used fuel type and the temperature are known as well, the compression module of the fuel is able to be determined in addition, and the fuel quantity actually withdrawn during the test triggering may be indicated even more precisely as a result.

In another specific development of the method according to the present invention, a fuel quantity possibly supplied into the rail by a high-pressure pump, as well as the pressure rise in the rail resulting therefrom are advantageously taken into account in evaluation 110. The test triggerings according to the exemplary embodiments and/or exemplary methods of the present invention are advantageously carried out only when no fuel quantity is being supplied into the rail or when no other types of triggerings that in turn cause changes in pressure, etc., are implemented.

The method according to the present invention may be carried out periodically, advantageously also during normal operation of an internal combustion engine (not shown) equipped with fuel injector 10, so that the instantaneous voltage requirement of fuel injector 10 is known at all times. This voltage requirement may be used for future triggering of piezoelectric actuator 12. This advantageously ensures that precise triggering of fuel injector 10 is possible even when wear and other circumstances arise that influence the operating parameters of fuel injector 10.

In one especially advantageous variant of the method according to the present invention, the test triggerings are implemented in a range of a working cycle of the cylinder that has no effect on the torque, for instance during retarded secondary injections and/or in trailing-throttle operation of the internal combustion engine, so that the method according to the present invention is implementable in parallel with a normal operation of the internal combustion engine, without affecting it in an adverse manner. The idling operation of the internal combustion engine may likewise be used for the test triggering according to the exemplary embodiments and/or exemplary methods of the present invention.

Figure 2:
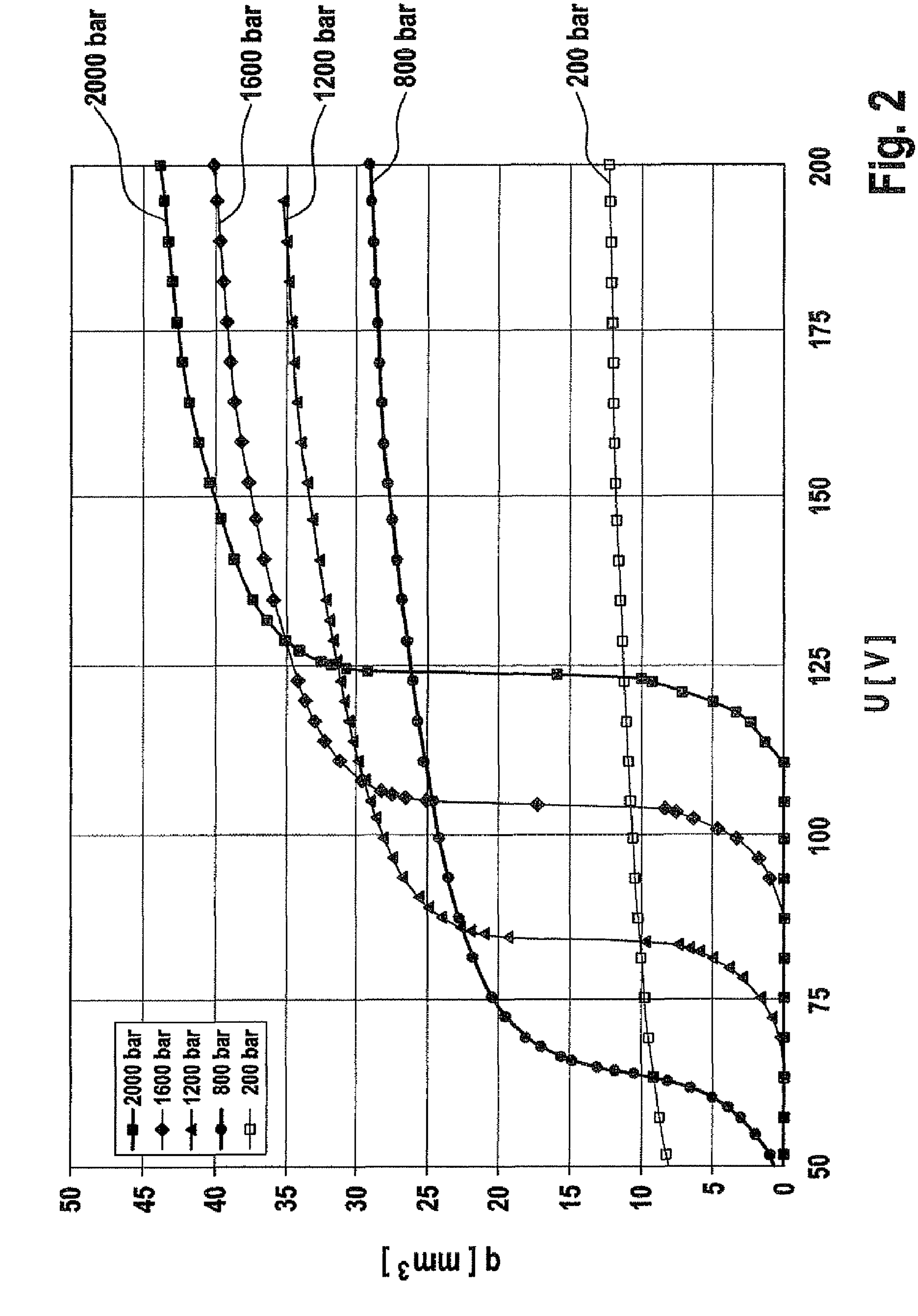
FIG. 2 a fuel quantity injected with the aid of a fuel injector as a function of a trigger voltage of the piezoelectric actuator.

Tests by the applicant have shown that in a fuel injector in which valve needle 13 is moved indirectly by actuator 12 via an additional control valve (not shown), the characteristic of an injected fuel quantity q shown in FIG. 2 results over trigger voltage U of actuator 12. FIG. 1 illustrates a total of five different curves as they result at the different rail pressure values of 200 bar to 2000 bar by way of example.

From FIG. 2 it may thus be inferred, for instance, that at a rail pressure of 2000 bar an injected fuel quantity rises strongly as soon as trigger voltage U exceeds a value of 125 Volt. In response to such a trigger voltage of 125 Volt, actuator 12 thus for the first time moves control valve out of a first neutral position to an extent that is sufficient to induce an injection. That is to say, according to FIG. 2, the voltage requirement of the examined fuel injector corresponds to 125 V at 2000 bar.

To determine the actual voltage requirement of a worn fuel injector, which deviates from the diagram, the method according to the present invention is implemented as described in the following text:

Beginning with a start value for the test voltage, a plurality of test triggerings 100, during which the test voltage is increased step by step, is carried out in succession (FIG. 3). According to the exemplary embodiments and/or exemplary methods of the present invention, taking the instantaneous rail pressure into account, the start value for the test voltage is selected in such a way that the triggering of an actuator 12 on the basis of the start value will not result in an injection yet. In practice, the start value is therefore generally selected much lower than the standard voltage requirement for a corresponding new fuel injector. In the present instance, the start value may be selected to be 80 V, for example. Correspondingly smaller start values, e.g., 50 Volt, etc., must be selected at a lower rail pressure of 800 bar, for instance.

As long as no significant pressure change in the fuel is ascertainable in the afore-described test triggerings, it may be assumed that no fuel was withdrawn from the rail. Correct opening of the fuel injector will be inferred only if a specifiable pressure change in the fuel occurs in the rail, which, for example, corresponds to a fuel quantity injected by a new fuel injector at a trigger voltage of approximately 125 V.

The thus determined instantaneous voltage requirement for the given rail pressure of 2000 bar may then be stored and used to modify future triggerings. The actual voltage requirement of a heavily worn fuel injector for a rail pressure of 2000 bar may amount to 140 V or more, for instance, so that an injection can be achieved only by a correspondingly high trigger voltage. Given knowledge of the actual voltage requirement determined according to the exemplary embodiments and/or exemplary methods of the present invention, setpoint values for trigger voltage U, specified by an engine controller that is likewise realized by control device 20 (FIG. 1) and which relate to a new, unworn fuel injector, may advantageously be modified in order to compensate for the particular aging effects. For instance, given the rail pressure of 2000 bar, a correction factor by which the specified setpoint values for trigger voltage U must henceforth be multiplied in order to take the wear of the fuel injector into account, may be formed from the quotient of the actual voltage requirement of 140 V and the standard voltage requirement of 125 V.

The actual voltage requirement for additional rail pressure values may be determined and used analogously, provided a sufficiently obvious change in fuel quantity q results above trigger or test voltage U.

Figure 4:
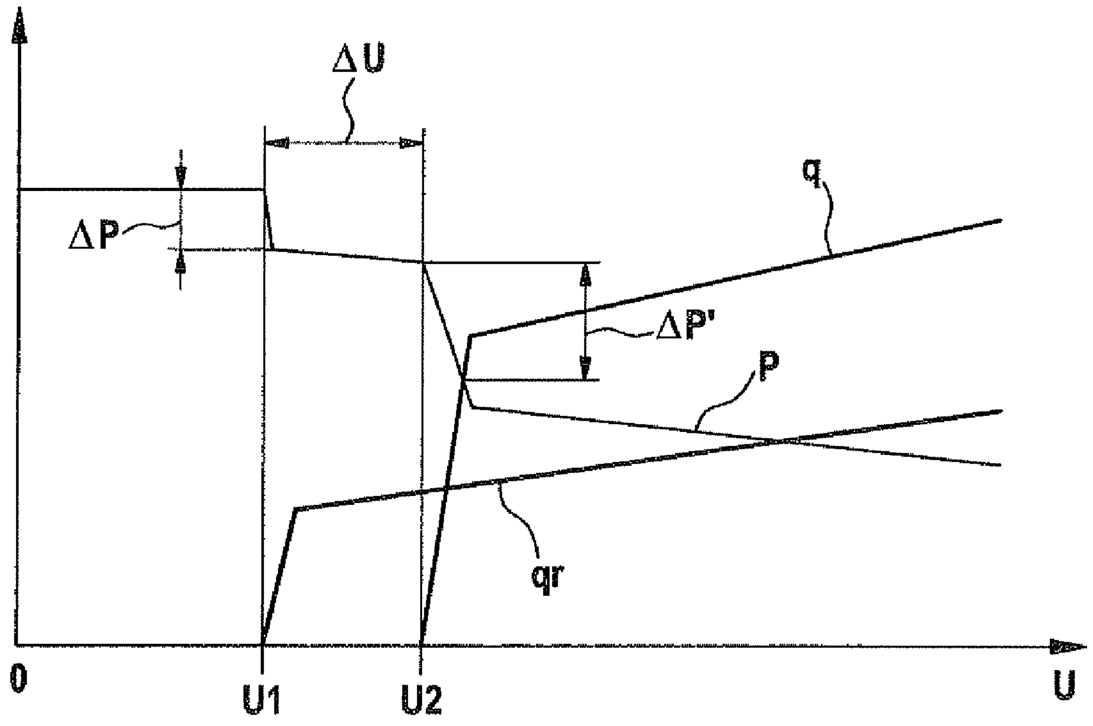
FIG. 4 the characteristic of different performance quantities of a fuel injector operated according to the present invention, over the trigger voltage of the piezoelectric actuator.

FIG. 4 illustrates the characteristic of different performance quantities of an additional fuel injector operated according to the exemplary embodiments and/or exemplary methods of the present invention, over trigger voltage U of a piezoelectric actuator 12. The fuel injector examined in this instance has a control chamber, which is able to be supplied with fuel from a supply system having a rail via a control or servo valve actuated by actuator 12, for the purpose of moving a valve needle 13.

As can be gathered from FIG. 4, a first change ΔP of rail pressure P determined according to the present invention results when trigger voltage U1 is exceeded. This change ΔP is attributable to the fact that, in response to the action of piezoelectric actuator 12, the control valve is moved slightly out of a first operating position, which corresponds to the closed state of the fuel injector, so that fuel from the rail is able to enter the control chamber previously sealed by the control valve. Change ΔP therefore corresponds to the fuel quantity withdrawn from the rail.

Since the afore-described, slight movement of the control valve is insufficient to cause an injection of fuel, it is solely the fuel quantity entering the control chamber that determines change ΔP. As indicated by the curve symbolizing a return quantity qr, this fuel quantity is supplied to a return line (not shown).

However, as soon as trigger voltage U exceeds a high enough value U2, which corresponds to the voltage requirement of the examined fuel injector, actuator 12 induces a sufficiently high movement of the control valve so that an injection is able to take place, cf. characteristic q of the injected fuel quantity. The injection is accompanied by a corresponding additional pressure drop ΔP', which is detected by the method according to the present invention.

It can be gathered from FIG. 4 that the afore-described design of the fuel injector having the control valve makes it possible to carry out test triggerings in a voltage range AU between U1 and U2, which, although causing a detectable pressure change ΔP, do not trigger an injection yet. According to the exemplary embodiments and/or exemplary methods of the present invention, this voltage range AU may thus be utilized to verify proper functioning of actuator 12. On account of the absence of a fuel injection in the test triggerings according to the afore-described variant of the method, the method may also be implemented in a trailing-throttle operation or in idling operation of the internal combustion engine, in particular, without causing changes in the rotational speed.

As an alternative to the afore-described variant of the exemplary embodiments and/or exemplary methods of the present invention, in which test triggerings are implemented on the basis of low values for the test voltage in order to avoid injections, it is also possible to start out with large values that cause injections and then lower the test voltage until a corresponding test triggering no longer induces an injection.

What is claimed is:

1. A method for operating an injection valve, which is operable by applying a trigger voltage to an actuator, which is a piezoelectric element, of the injection valve to induce an injection of fluid, which is fuel, supplied to the injection valve via a supply system, the method comprising:

applying a specifiable test voltage to the actuator in a test triggering; and detecting a fluid pressure prevailing in a supply system at least during the test triggering to derive information about an operating state of at least one of the injection valve and the actuator from the test voltage and a detected fluid pressure;

wherein one of a minimum trigger voltage and a maximum trigger voltage of the actuator at which an injection occurs is determined by at least one test triggering.

2. The method of claim 1, wherein a plurality of test triggerings using different values for the test voltage is performed, and changes in a fluid pressure detected in the process are determined.

3. The method of claim 1, in which the injection valve is a fuel injector for injecting fuel into a combustion chamber of a cylinder of an internal combustion engine, wherein the test triggerings are performed periodically, during a normal operation of the internal combustion engine.

4. The method of claim 1, in which the injection valve is a fuel injector for injecting fuel into a combustion chamber of a cylinder of an internal combustion engine, wherein the test triggering is performed in at least one of a range of a working cycle of the cylinder that does not affect a torque and in a trailing-throttle operation of the internal combustion engine.

5. The method of claim 1, wherein the information about an operating state of at least one of the injection valve and the actuator, obtained using the test triggerings, is used to modify at least one control parameter of the fuel injector, which includes at least the trigger voltage.

6. The method of claim 1, wherein the actuator acts on a valve needle of the injection valve, which is a fuel injector, via at least one hydraulic component, which is a control valve, to induce an injection, and wherein a start value for the test voltage is selected so that if the actuator is triggered by the start value for the test voltage, no change in a state of the hydraulic component results so that an injection occurs.

7. The method of claim 6, wherein the start value for the test voltage is selected as a function of at least one of the fluid pressure and at least another performance quantity of the fuel injector.

8. A computer readable medium having a computer program executable by a processor, comprising:

a program code arrangement having computer program code for operating an injection valve, which is operable by applying a trigger voltage to an actuator, which is a piezoelectric element, of the injection valve to induce an injection of fluid, which is fuel, supplied to the injection valve via a supply system, by performing the following:

applying a specifiable test voltage to the actuator in a test triggering; and detecting a fluid pressure prevailing in a supply system at least during the test triggering to derive information about an operating state of at least one of the injection valve and the actuator from the test voltage and a detected fluid pressure;

wherein one of a minimum trigger voltage and a maximum trigger voltage of the actuator at which an injection occurs is determined by at least one test triggering.

9. The computer readable medium of claim 8, wherein a plurality of test triggerings using different values for the test voltage is performed, and changes in a fluid pressure detected in the process are determined.

10. The computer readable medium of claim 8, in which the injection valve is a fuel injector for injecting fuel into a combustion chamber of a cylinder of an internal combustion engine, wherein the test triggerings are performed periodically, during a normal operation of the internal combustion engine.

11. The computer readable medium of claim 8, in which the injection valve is a fuel injector for injecting fuel into a combustion chamber of a cylinder of an internal combustion engine, wherein the test triggering is performed in at least one of a range of a working cycle of the cylinder that does not affect a torque and in a trailing-throttle operation of the internal combustion engine.

12. The computer readable medium of claim 8, wherein the information about an operating state of at least one of the injection valve and the actuator, obtained using the test triggerings, is used to modify at least one control parameter of the fuel injector, which includes at least the trigger voltage.

13. The computer readable medium of claim 8, wherein the actuator acts on a valve needle of the injection valve, which is a fuel injector, via at least one hydraulic component, which is a control valve, to induce an injection, and wherein a start value for the test voltage is selected so that if the actuator is triggered by the start value for the test voltage, no change in a state of the hydraulic component results so that an injection occurs.

14. The computer readable medium of claim 13, wherein the start value for the test voltage is selected as a function of at least one of the fluid pressure and at least another performance quantity of the fuel injector.

15. A control device for an injection valve, the control device comprising:

a control arrangement for operating the injection valve, which is operable by applying a trigger voltage to an actuator, which is a piezoelectric element, of the injection valve to induce an injection of fluid, which is fuel, supplied to the injection valve via a supply system, the control arrangement including:

an applying arrangement to apply a specifiable test voltage to the actuator in a test triggering; and a detecting arrangement to detect a fluid pressure prevailing in a supply system at least during the test triggering to derive information about an operating state of at least one of the injection valve and the actuator from the test voltage and a detected fluid pressure;

wherein one of a minimum trigger voltage and a maximum trigger voltage of the actuator at which an injection occurs is determined by at least one test triggering.

16. The control device of claim 15, wherein the injection valve is a fuel injector of an internal combustion engine of a motor vehicle.

17. The control device of claim 15, wherein a plurality of test triggerings using different values for the test voltage is performed, and changes in a fluid pressure detected in the process are determined.

18. The control device of claim 15, in which the injection valve is a fuel injector for injecting fuel into a combustion chamber of a cylinder of an internal combustion engine, wherein the test triggerings are performed periodically, during a normal operation of the internal combustion engine.

19. The control device of claim 15, in which the injection valve is a fuel injector for injecting fuel into a combustion chamber of a cylinder of an internal combustion engine, wherein the test triggering is performed in at least one of a range of a working cycle of the cylinder that does not affect a torque and in a trailing-throttle operation of the internal combustion engine.

20. The control device of claim 15, wherein the information about an operating state of at least one of the injection valve and the actuator, obtained using the test triggerings, is used to modify at least one control parameter of the fuel injector, which includes at least the trigger voltage.

21. The control device of claim 15, wherein the actuator acts on a valve needle of the injection valve, which is a fuel injector, via at least one hydraulic component, which is a control valve, to induce an injection, and wherein a start value for the test voltage is selected so that if the actuator is triggered by the start value for the test voltage, no change in a state of the hydraulic component results so that an injection occurs.

22. The control device of claim 21, wherein the start value for the test voltage is selected as a function of at least one of the fluid pressure and at least another performance quantity of the fuel injector.

* * * * *